(12) United States Patent
Tomforde et al.

(10) Patent No.: US 11,053,113 B2
(45) Date of Patent: Jul. 6, 2021

(54) BEVERAGE MANAGEMENT SYSTEM

(71) Applicant: Pour Technology LLC, Cheverly, MD (US)

(72) Inventors: Nate Tomforde, Greenville, SC (US); Joel Thomas, Cheverly, MD (US); Jaret Earley, Newnan, GA (US); Larry Gorman, Morro Bay, CA (US); Dan Harper, San Luis Obispo, CA (US)

(73) Assignee: Pour Technology LLC, Cheverly, MD (US)

(*) Notice: Subject to any disclaimer, the term of this patent is extended or adjusted under 35 U.S.C. 154(b) by 55 days.

(21) Appl. No.: 16/016,519

(22) Filed: Jun. 22, 2018

(65) Prior Publication Data

US 2019/0071298 A1 Mar. 7, 2019

Related U.S. Application Data

(60) Provisional application No. 62/524,396, filed on Jun. 23, 2017.

(51) Int. Cl.
*B67D 1/08* (2006.01)
*G06K 7/14* (2006.01)
(Continued)

(52) U.S. Cl.
CPC ............ *B67D 1/0888* (2013.01); *A47J 31/00* (2013.01); *G06K 7/1417* (2013.01);
(Continued)

(58) Field of Classification Search
None
See application file for complete search history.

(56) References Cited

U.S. PATENT DOCUMENTS

| 5,731,981 A | 3/1998 | Simard |
| 5,769,271 A | 6/1998 | Miller |

(Continued)

FOREIGN PATENT DOCUMENTS

| WO | 200224569 | 3/2002 |
| WO | 2011107146 | 9/2011 |

(Continued)

OTHER PUBLICATIONS

ValidFill Coffee and Kiosk Demonstration, Youtube, Jun. 7, 2015 (Retrieved from Interneton Sep. 24, 2019).URL: https://www.youtube.com/watch?v=ZKOhJVdcsxl (Year: 2015).*

(Continued)

*Primary Examiner* — Jessica Cahill
*Assistant Examiner* — Christopher M Afful
(74) *Attorney, Agent, or Firm* — Fitch, Even, Tabin & Flannery LLP

(57) ABSTRACT

Systems and methods for dispensing beverages are described. The systems and methods enable convenient control and monitoring for dispensing one or more different beverages. The system may include a system for identifying a beverage based on a passive identifier (e.g., quick response (QR code)), a beverage database, a controller for matching a user to a beverage, a flow input device, an automated flow valve, and a flow meter for measuring an amount of the beverage dispensed and generating a signal, so the controller can subtract the amount of beverage dispensed from a beverage allocation amount.

6 Claims, 18 Drawing Sheets

(51) Int. Cl.
*G06Q 20/32* (2012.01)
*G06Q 20/20* (2012.01)
*A47J 31/00* (2006.01)
*G06Q 20/18* (2012.01)
*G06Q 20/14* (2012.01)
*G07F 13/06* (2006.01)
*G06Q 10/08* (2012.01)

(52) U.S. Cl.
CPC ........... *G06Q 20/145* (2013.01); *G06Q 20/18* (2013.01); *G06Q 20/204* (2013.01); *G06Q 20/322* (2013.01); *G06Q 20/3276* (2013.01); *G07F 13/065* (2013.01); *G06Q 10/087* (2013.01)

(56) References Cited

U.S. PATENT DOCUMENTS

| | | | |
|---|---|---|---|
| 8,127,805 B2 | 3/2012 | Dorney | |
| 8,610,536 B2 | 12/2013 | Libby | |
| 8,655,732 B1 | 2/2014 | Wilinski | |
| 8,880,427 B1 * | 11/2014 | Jones | G06Q 30/0635 |
| | | | 705/22 |
| 9,199,833 B2 | 12/2015 | Scarvelli | |
| 9,334,150 B1 * | 5/2016 | Ost | B67D 1/1236 |
| 2007/0233567 A1 | 10/2007 | Daly | |
| 2009/0125457 A1 | 5/2009 | Farhan | |
| 2015/0032555 A1 * | 1/2015 | Jones | G06Q 10/087 |
| | | | 705/15 |
| 2016/0355389 A1 | 12/2016 | Bursey | |
| 2017/0001851 A1 | 1/2017 | Istin | |

FOREIGN PATENT DOCUMENTS

WO 2014076296 5/2014
WO WO-2015153565 A1 * 10/2015

OTHER PUBLICATIONS

Pour My Beer; "Self-Serve Beer and Wine Dispensing from Pour My Beer"; Apr. 13, 2017; retrieved copy on Jun. 28, 2018 from https://pourmybeer.com/; 6 pages.

Tuttle, B; "Self-Serve Craft Beer Is Coming, and It Might Even Save You Money"; May 24, 2015; retrieved copy on Jun. 28, 2018 from http://time.com/money/3755085/self-serve-beer-pay-by-ounce/; 3 pages.

* cited by examiner

| Pour Technology Portal | ≡ Admin Portal | | Administrator | 👤 John Doe |
|---|---|---|---|---|
| Dashboard | Dashboard 405 | | | 415 |
| Beer | FRANCHISE | FROM DATE | TO DATE | |
| Brewery | Test Franchise 1 ▸ | 06/15/2018 | 06/15/2018 | Update  Export |
| Franchise | Financial | | | 420 |
| Keg Location | 156 Pour Count | 703.63 Ounces Poured | $362.97 Revenue | $0.00 Discount | $362.97 Revenue After Discount |
| Keg Type | | | | |
| Tablet | Summary | | | 425 |
| Tap | 703.63 NO. OF OUNCES | 22.70 AVG. OUNCES POURED PER PATRON | 5 AVG. POUR SIZE | 31 NO. OF PATRON COUNT |
| User Management | Leaderboard | | | 430 |
| | Strawberry Blonde (2018) *Frothy Beard* 76 oz Rank 1 | Dance Naked *Rusty Bull Brewing* 58 oz Rank 2 | Desert Dawn *Southbound Bre....* 53 oz Rank 3 | Basic Beach *Freehouse Brewi...* 41 oz Rank 4 |

FIG. 4

| Pour Technology Portal | ≡ Admin Portal | | Administrator | 👤 John Doe |
|---|---|---|---|---|
| Dashboard | Franchise | | | |
| Beer | | | | |
| Brewery | | Search for Franchise by Name 🔍 | + Add New | ⟳ Refresh |
| Franchise | ID ⇅ | Name ⇅ | Enabled ⇅ | Address ⇅ | CloverMerchantID | Action |
| Keg Location | 1 | Test Franchise 1 | true | 727 Piney Way | EDVK3DRWEH09T | 🗑 |
| Keg Type | 2 | Test Franchise 2 | true | 727 Piney Way | sq0idp-VMdGHZIPK | 🗑 |
| Tablet | 3 | Charleston Store | true | 560 King St. | 1A6DK7BE06 | 🗑 |
| Tap | 10 | Bejoy Franchise | true | 201 west main st | JMBZK04RXWM | 🗑 |
| User Management | Showing 1-4 of 4 items. | | | | « ‹ 1 › » | |

FIG. 5

| Pour Technology Portal | ☰ Admin Portal | | Administrator | 👤 John Doe |
|---|---|---|---|---|
| Dashboard | Tablets | | | |
| Beer | Charleston Store ▼ | | Search for Tablet Id 🔍 | + Add New  ↻ Refresh |
| Brewery | | | | |
| Franchise | ID ⇅ | Tablet Id ⇵ | Tablet Manu. ⇵ | Tablet Name ⇵ | Tablet Os Version ⇵ | Action |
| Keg Location | 1 | RS2J30QFSP | Samsung | Tab A 7.0 | 6.0.1 | 🗑 |
| Keg Type | 2 | RS2J21FKLK | Samsung | Tab A 7.0 | 6.0.1 | 🗑 |
| Tablet | 3 | RS2J30ZCAD | Samsung | Tab A 7.0 | 6.0.1 | 🗑 |
| Tap | 4 | RS2J30PLZF | Samsung | Tab A 7.0 | 6.0.1 | 🗑 |
| User Management | 5 | RS2J30AFWL | Samsung | Tab A 7.0 | 6.0.1 | 🗑 |
| | 6 | RS2J30QETY | Samsung | Tab A 7.0 | 6.0.1 | 🗑 |
| | 7 | RS2J30VBXW | Samsung | Tab A 7.0 | 6.0.1 | 🗑 |
| | 8 | RS2J30QLFP | Samsung | Tab A 7.0 | 6.0.1 | 🗑 |
| | 9 | RS2J30AAFS | Samsung | Tab A 7.0 | 6.0.1 | 🗑 |

Pour Technology Portal ≡ Admin Portal     Administrator   ⊙ John Doe

Dashboard

Beer

Brewery

Franchise

Keg Location

Keg Type

Tablet

Tap

User Management

Taps

Charleston Store ▼    Search for Tap Id 🔍    + Add New   ↻ Refresh

| ID ⇅ | Tap Id ⇵ | Enabled ⇵ | Threshold ⇵ | Beer ⇵ | Action ⇵ |
|---|---|---|---|---|---|
| 1 | 1 | true | 20 | Riesling | 🗑 |
| 2 | 2 | true | 20 | Reserve Chardonnay | 🗑 |
| 3 | 3 | true | 20 | Vin Gris de Cigare | 🗑 |
| 4 | 4 | true | 20 | Reserve Chardonnay | 🗑 |
| 5 | 5 | true | 10 | GSM | 🗑 |
| 6 | 6 | true | 10 | Malbec | 🗑 |
| 7 | 7 | true | 10 | Clos de Gilroy Grenache | 🗑 |
| 8 | 8 | true | 10 | Cabernet Sauvignon | 🗑 |
| 9 | 9 | true | 10 | Southern Delight | 🗑 |

| Pour Technology Portal | ≡ Admin Portal | | Administrator | 👤 John Doe |
|---|---|---|---|---|
| Dashboard | Beer | | | |
| Beer | | Search for Beer by name 🔍 | | + Add New ↻Refresh |
| Brewery | | | | |
| Franchise | ID ↕ | Name ↕ | Abv ↕ | Ibu ↕ | Brewery ↕ | Action |
| Keg Location | 1 | Gravitas | 13.5 | 20 | Bonny Doon Vineyard | 🛢 |
| Keg Type | 2 | Pinot Grigio | 13.5 | 20 | Proletariat Wine Company | 🛢 |
| Tablet | 3 | Picpoul | 12.7 | 20 | XX | 🛢 |
| Tap | 4 | Chardonnay | 13.5 | 20 | CA Palma | 🛢 |
| User Management | 5 | Vin Gris de C... | 13.5 | 10 | Bonny Doon Vineyard | 🛢 |
| | 6 | Tempranillo | 13.5 | 10 | Bernardo Farina | 🛢 |
| | 7 | Reata | 13.9 | 10 | Jameson Ranch | 🛢 |
| | 8 | Cabarnet | 13.5 | 10 | CA Palma | 🛢 |
| | 9 | Test beer | 5 | 10 | King St. Single Barrel | 🛢 |

FIG. 8

| Pour Technology Portal | ☰ Admin Portal | Administrator | 👤 John Doe |
|---|---|---|---|

Keg Types

Search for Keg Type by name 🔍   + Add New   ↻ Refresh

| ID ↕ | Name ↕ | Capacity Oz ↕ | Height ↕ | Weight ↕ | Action ↕ |
|---|---|---|---|---|---|
| 1 | Mini Keg | 180 oz. | 9.875" | 13 lbs. | 🛢 |
| 2 | Cornelius Keg | 640 oz. | 23" | 49 lbs. | 🛢 |
| 3 | Sixth Barrel | 661 oz. | 23.375" | 58 lbs. | 🛢 |
| 4 | Quarter Barrel | 992 oz. | 13.725" | 87 lbs. | 🛢 |
| 5 | Slim Quarter | 992 oz. | 23.375" | 87 lbs. | 🛢 |
| 6 | Half Barrel | 1984 oz. | 23.375" | 161 lbs. | 🛢 |
| 7 | Rubber Barrel | 992 oz. | 13.725" | 87 lbs. | 🛢 |
| 8 | Beveled Barrel | 992 oz. | 13.725" | 87 lbs. | 🛢 |

Showing 1-8 of 8 items.   « ‹ 1 › »

Sidebar: Dashboard, Beer, Brewery, Franchise, Keg Location, Keg Type, Tablet, Tap, User Management

FIG. 10

BEVERAGE MANAGEMENT SYSTEM

This application claims the benefit of U.S. Provisional Application No. 62/524,396, filed Jun. 23, 2017, for BEVERAGE MANAGEMENT SYSTEM, which is incorporated in its entirety herein by reference.

BACKGROUND OF THE INVENTION

Field of the Invention

The present invention relates generally to dispensing beverages, and more specifically to dispensing beverages using a computer controlled beverage system.

Beverages are an important part of the diet for most human beings. They provide sustenance, hydration, gratification and entertainment. Thus, systems designed to store and dispense beverages are ubiquitous. Many beverage dispensing systems are simple or low technology systems that do not facilitate flow control or monitoring. This may be insufficient for beverage providers that seek to automatically monitor or control their beverage dispensers.

SUMMARY

A system for dispensing beverages using a computer controlled beverage system is described. The system may include a QR code, a camera for capturing an image of the QR code, a detection system coupled to the camera and configured to read the image of the QR code, and interpret the QR code to generate a user identifier, a database comprising a plurality of records, each record including a user identifier field, and a beverage allocation field, a controller configured to compare the user identifier to at least one of the records to determine if the user identifier matches the user identifier field for the at least one record, and for reading a beverage allocation from the beverage allocation field for the at least one record in the event the user identifier matches the user identifier field for the at least one record, a flow input device for receiving a flow input from a user, wherein the controller is configured to generate a flow signal in the event the beverage allocation indicates an amount of beverage greater than zero, and the flow input is received, a flow valve responsive to the flow signal configured to open in response to the flow signal having been generated, whereby a beverage is dispensed in response to the flow valve opening, and a flow meter for measuring an amount of the beverage dispensed and generating a beverage dispensed signal, wherein the controller is configured to subtract the amount of beverage dispensed from the beverage allocation, whereby the beverage allocation field for the at least one record is updated.

A method of using an apparatus for dispensing beverages using a computer controlled beverage system is described. The method may include using a QR code, using a camera for capturing an image of the QR code, using a detection system coupled to the camera and configured to read the image of the QR code, and interpret the QR code to generate a user identifier, using a database comprising a plurality of records, each record including a user identifier field, and a beverage allocation field, using a controller configured to compare the user identifier to at least one of the records to determine if the user identifier matches the user identifier field for the at least one record, and for reading a beverage allocation from the beverage allocation field for the at least one record in the event the user identifier matches the user identifier field for the at least one record, using a flow input device for receiving a flow input from a user, wherein the controller is configured to generate a flow signal in the event the beverage allocation indicates an amount of beverage greater than zero, and the flow input is received, using a flow valve responsive to the flow signal configured to open in response to the flow signal having been generated, whereby a beverage is dispensed in response to the flow valve opening, and using a flow meter for measuring an amount of the beverage dispensed and generating a beverage dispensed signal, wherein the controller is configured to subtract the amount of beverage dispensed from the beverage allocation, whereby the beverage allocation field for the at least one record is updated.

A system for dispensing beverages using a computer controlled beverage system is described. The system may include a plurality of beverage source systems, each beverage source system including a beverage source, a valve for dispensing the beverage source and a microcontroller configured to control the valve, a beverage system server in communication with each beverage source system and configured to send indications to the microcontroller, whereby the valve is controlled, an administrative portal in communication with the beverage system server, a beverage database in communication with the beverage system server, a POS system in communication with the beverage system server, and at least one database storing data on beverage dispensing using the beverage dispensing system.

A method of dispensing beverages using a computer controlled beverage system is described. The method may include authorizing a customer, associating with the authorized customer an optically viewable passive identifier, detecting, by a computing device coupled to the beverage, the identifier, sending, by the device, to a beverage system server, an indication of the identifier, sending, by the beverage system server to the device, an indication that a flow valve fluidly coupled to the beverage should be activated, and activating, by the customer, of a manual tap fluidly coupled to the beverage, whereby the beverage is dispensed.

An apparatus for dispensing beverages using a computer controlled beverage system is described. The apparatus may include a processor, memory in electronic communication with the processor, and instructions stored in the memory. The instructions may be operable to cause the processor to authorize a customer, associate with the authorized customer an optically viewable passive identifier, detect, by a computing device coupled to the beverage, the identifier, send, by the device, to a beverage system server, an indication of the identifier, send, by the beverage system server to the device, an indication that a flow valve fluidly coupled to the beverage should be activated, and activate, by the customer, of a manual tap fluidly coupled to the beverage, whereby the beverage is dispensed.

A method of dispensing beverages using a computer controlled beverage system is described. The method may include authorizing, by a beverage system server, a customer via a customer mobile device running a customer mobile application, sending from the device to the server, based on user input, a request for dispensing the beverage, sending, by the beverage system server to a computing device operatively coupled to the beverage, an indication that a flow valve fluidly coupled to the beverage should be activated, and activating, by the customer, of a manual tap fluidly coupled to the beverage, whereby the beverage is dispensed.

An apparatus for dispensing beverages using a computer controlled beverage system is described. The apparatus may include a processor, memory in electronic communication with the processor, and instructions stored in the memory.

The instructions may be operable to cause the processor to receive user input via a user interface of a wireless device, send from the wireless device wirelessly a request to a remote beverage system server for access to the beverage source, receive at the wireless device wirelessly an indication from the beverage system server in response to the request, wherein the indication indicates whether access to the beverage source is authorized, and perceptibly indicate to a human user of the wireless device with the wireless device the indication.

BRIEF DESCRIPTION OF THE DRAWINGS

FIG. 4 shows an exemplary administrative portal dashboard interface in accordance with aspects of the present disclosure.

FIG. 5 shows an exemplary administrative portal franchise interface in accordance with aspects of the present disclosure.

FIGS. 6 and 7 show an exemplary administrative portal tablet interface in accordance with aspects of the present disclosure.

FIG. 8 shows an exemplary administrative portal beverage interface in accordance with aspects of the present disclosure.

FIG. 10 shows an exemplary administrative keg type interface in accordance with aspects of the present disclosure.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
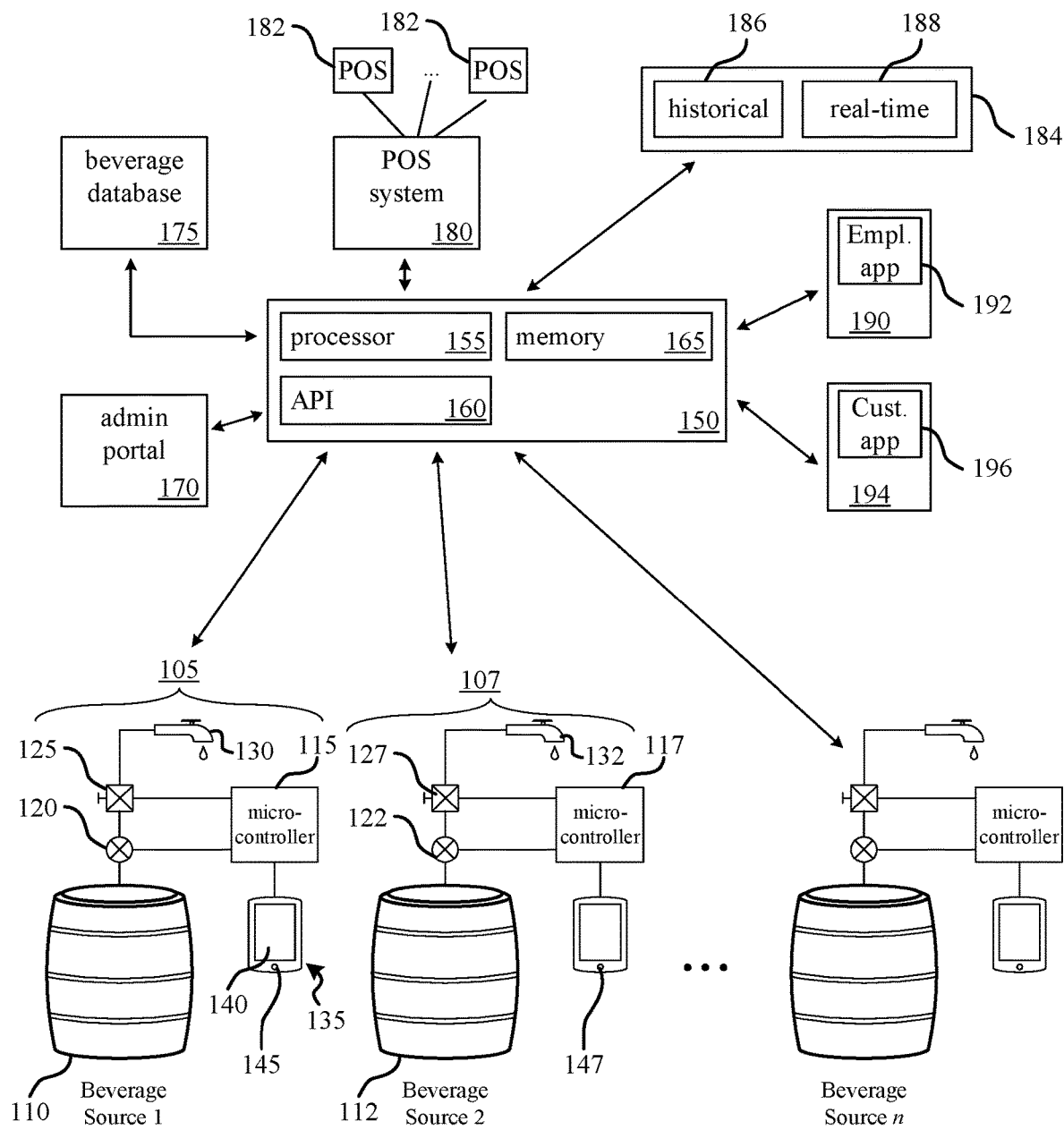
FIG. 1 shows an example of a schematic block diagram of a beverage dispensing system in accordance with aspects of the present disclosure.

FIG. 1 shows an example of a schematic block diagram of a beverage dispensing system 100 in accordance with aspects of the present disclosure. The example shown includes beverage dispensing system 100, which may include a plurality of beverage source systems 105, one dispensing system for each beverage source 110. Each beverage source system 105 includes a beverage source 110, a computer microcontroller 115, a flow meter 120, a solenoid flow valve 125, a tap valve 130, and a computing device 135 (e.g., a tablet). The computer microcontroller 115 (e.g., ARDUINO®) is operatively coupled to the smart tablet computing device 135 (e.g. 7" or 8" android tablet). The microcontroller 115 is in communication with a beverage system server 150. The microcontroller 115 controls the operation of other hardware (the flow valve 125, and flow meter 120).

Also shown are the flow valve 125 electrically controlled by the microcontroller 115. A manual tap valve 130 is fluidly coupled to the flow valve 125 and is manually controlled (by the user, e.g., the customer). The computing device 135 is configured for user interaction and includes a display 140 and a quick response (QR) code reader 145 (or other type of code reader). The electrically controlled flow valve 125 may be an off-the-shelf normally closed, electrically actuated (12 volt) valve.

The flow valve 125 is positioned between the beverage source 110 (e.g. a beer keg) and the manually activated tap valve 130 (e.g. a beer tap) downstream. If the electrically controlled flow valve 125 is activated by the microcontroller 115, then the electrically controlled valve is open, and beverage flow is possible. If the value is off (deactivated), then no flow of beverage is possible.

The manually controlled tap valve 130 (e.g. a beer tap), which is downstream from the electrically controlled flow valve 125, provides for customer interaction (via pulling the tap handle) to allow flow of the beverage into the customer's glass when the flow valve 125 is open. A flow meter 120 is coupled to the microcontroller 115, and measures the volume of flow (e.g., amount of beverage dispensed in, for example, fractions of ounces, such as in $10^{th}$ of an ounce or $100^{th}$ of an ounce) whenever flow occurs. The output from the flow meter 120 is sent to the beverage system server 150 and may be stored in a database (e.g., in the cloud) or may be directly subtracted from a prepaid amount stored in the database in a record associated with the specific user or customer who dispensed or purchased the beverage.

A database may be stored and managed on a remote server, such as a cloud-based server. A computing device 135 communicates with the electronic flow valve 125 and the flow meter 120 through the computer microcontroller 115, and the database. The beverage source system 105 dispenses beverages (such as, for example, beer, wine, water, soft drinks, carbonated beverages, juices, mixed drinks, kombucha, coffee, beverage additives, e.g., shots of alcohol or flavor additives, and the like), other flowable food products or human-consumable products (such as ice cream, gelato, frozen yogurt, yogurt, sauces, (e.g. barbeque sauces), jellies, marinade, gravies, puddings, custards, purees, cheeses, condiments, toppings, flavor enhancers, air or oxygen or other gasses, such as essences or smells, and the like), or any other flowably dispensed product (resins, medications, etc.) directly to a user, such as a customer of a drinking or eating establishment (bar, restaurant) or venue in which the beverages are being dispensed (such as a music or sports venue). For example, a common use would be the dispensing of beer in a bar or pub, in which case the present embodiment can be described as "customer activated beer taps." It will be understood that while specific types of beverages and beverage containers/dispensers may be referred to in the specification (such as beer/kegs/beer taps) the disclosure contemplates the system being adapted for any type of flowable product and suitable container/dispenser.

The beverage dispensing system 100 may include any number of beverage source systems 105. In one embodiment, fewer than 20 beverage source systems 105 are included in the beverage dispensing system 100. In another embodiment, 20-70 beverage source systems 105 are included in the beverage dispensing system 100. In yet another embodiment, greater than 70 beverage source systems 105 are included in the beverage dispensing system 100.

As previously described, each beverage source system 105 is in communication with the beverage system server 150. Wired or wireless communication may be used. The beverage system server 150 includes one or more processors, storage devices, memory 165, networking modules, and Application Programming Interfaces (APIs) 160 and/or or other software suitable for communicating between and implementing the beverage system processes. In some embodiments the beverage system server 150 comprises AWS® lambda serverless technology with backend logic written as lambda functions. In some embodiments, an Artificial Intelligence (AI) module 198 may be included in the beverage source server 150. The AI module 198 uses artificial intelligence to provide additional data analytics and/or applies artificial intelligence to other aspects of the beverage dispensing system 100.

The APIs 160 may include a user API, a tablet API, a dispenser (e.g. tap) API, an AWS® image API, an authentication API, an account API, a beverage container (e.g. keg) API, a beverage container location API, a beverage (e.g. beer) API, a manufacturer (e.g. brewery) API, and/or a customer (e.g. bar) API.

An administrative portal 170 is in communication with the beverage system server 150. The Administrative portal 170 includes a user interface and applications for receiving user input, transferring data to and from the beverage system server 150 and displaying/managing the system items and parameters. Exemplary screen shots of the administrative portal 170 user interface are shown in FIGS. 4-12. The administrative portal 170 may be used by employees to view system information, change system information, view diagnostics, track point-of-sale (POS) transactions, manage inventory, and other administrative activities. The administrative portal 170 obtains and sends information via the beverage system server 150. For example, the administrative portal 170 receives beverage information from the beverage database 175 via the beverage system server 150. The administrative portal 170 is described further below in FIGS. 4-12.

The beverage database 175 stores data regarding the beverages sources, such as type, location, pricing, beverage characteristics, brewery, etc. The beverage database 175 is in communication with the beverage system server 150 and may be updated via the administrative portal 170.

The POS system 180 is in communication with the beverage system server 150. The POS system 180 may include multiple POS terminals 182 in communication with the POS system 180, where the terminals are used to enter customer orders and take payments. The POS system 180 also includes accounting, billing, and management services for POS transactions. The POS system 180 can be configured for any type of currency, for example, cash, credit cards, virtual currency (e.g. bitcoin), foreign currencies, etc. In some embodiments the POS system 180 is configured to manage a rewards/loyalty system where users can earn and redeem rewards, coupons, and/or other incentives. The rewards offered can be based on purchase history and/or other parameters.

Additional databases may include at least a historical data 186 database and a real-time database 188. The databases receive data from the various system components via the beverage system server 150. The historical database includes data regarding past beverage data such as pours per day, amounts of each beverage poured per day, etc. The real-time database 188 determines and stores real-time data 188 to determine real-time popularity of beverages and other fluctuating parameters in real-time. In some embodiments data in the databases may be collected into data products and sold to another party, for example a supplier interested in data regarding beverage consumption.

One or more employee mobile devices 194 running a beverage administration application may be in communication with the beverage system server 150 to allow an employee to set up an account for a customer, take payment from a customer, and control beverage access. The beverage dispensing system 100 is configured to communicate with mobile customer devices 194 running a customer mobile app. The mobile app is configured to send and receive information to/from the beverage system server 150 that allows the customer to set up an account, make payments, and control beverage access. The system integrates custom software and a custom hardware configuration.

The computing device 135 may be a personal computer, laptop computer, mainframe computer, palmtop computer, personal assistant, mobile device, or any other suitable processing apparatus.

The microcontroller 115 may include an intelligent hardware device, (e.g., a general-purpose processing component, a digital signal processor (DSP), a central processing unit (CPU), a microcontroller, an application specific integrated circuit (ASIC), a field programmable gate array (FPGA), a programmable logic device, a discrete gate or transistor logic component, a discrete hardware component, or any combination thereof).

In some cases, the microcontroller 115 may be configured to operate a memory array using a memory controller. In other cases, a memory controller may be integrated into processor. The processor may be configured to execute computer-readable instructions stored in a memory to perform various functions. In some examples, a processor may include special purpose components for modem processing, baseband processing, digital signal processing, or transmission processing. In some examples, the processor may comprise a system-on-a-chip.

A database such as beverage database 175, historical data 186 database and real-time database 188, may store data in a structured format. A database may be structured as a single database, a distributed database, multiple distributed databases, or an emergency backup database. In some cases, a database controller may manage data storage and processing in a database. In some cases, a user may interact with database controller. In other cases, database controller may operate automatically without user interaction.

Beverage server 150 may provide one or more functions to requesting users linked by way of one or more of the various networks (LAN, WAN, Internet, etc.). In some cases, the server may include a single microprocessor board, which may include a microprocessor responsible for controlling all aspects of the server. In some cases, beverage server 150 may use microprocessor and protocols to exchange data with other devices/users on one or more of the networks via HTTP, and SMTP, although other protocols such as FTP, and SNMP. In some cases, the server may be configured to send and receive HTML formatted files (e.g., for displaying web pages). A server may be a general purpose computing device, a personal computer, a laptop computer, a mainframe computer, a super computer, or any other suitable processing apparatus.

Thus, beverage dispensing system 100 may include beverage source system 105, beverage system server 150, administrative portal 170, beverage database 175, POS system 180, analytics database 184, employee device 190, and customer device 194.

In some cases, the beverage source system 105 may include a flow input device for receiving a flow input from a user, wherein the controller is configured to generate a flow signal in the event the beverage allocation indicates an amount of beverage greater than zero, and the flow input is received.

A second beverage source system 107 may include a second flow input device 132 for receiving a second flow input from the user, wherein a second controller 117 is configured to generate a second flow signal in the event the beverage allocation indicates an amount of beverage greater than zero, and the second flow input is received. The second beverage source system 107 may also include a second flow valve 127 responsive to the second flow signal configured to open in response to the second flow signal having been generated, whereby a second beverage is dispensed in response to the second flow valve 127 opening. The second beverage source system 107 may also include a second flow meter 122 for measuring an amount of the beverage dispensed from a second beverage source 112 in response to the opening of the second flow valve 127 and generating a second beverage dispensed signal, wherein the controller 117 is configured to subtract the amount of beverage dispensed from the beverage allocation, whereby the beverage allocation field for the at least one record is updated.

The second beverage source system 107 may also include a second camera 147 for capturing the image of the QR code. The second beverage source system 107 may also include a second detection system coupled to the second camera 147 and configured to read the image of the QR code, and interpret the QR code to generate a user identifier.

Each beverage source system 105 may include a beverage source 110, a valve for dispensing the beverage source 110 and a microcontroller 115 configured to control the valve.

Beverage source system 105 may be an example of, or include aspects of, the corresponding elements described with reference to FIGS. 2 and 3. Beverage source system 105 may include beverage source 110, microcontroller 115, flow meter 120, flow valve 125, tap valve 130, and computing device 135.

The microcontroller 115 may be an example of a controller configured to compare the user identifier to at least one of the records to determine if the user identifier matches the user identifier field for the at least one record, and for reading a beverage allocation from the beverage allocation field for the at least one record in the event the user identifier matches the user identifier field for the at least one record.

The flow meter 120 may be used for measuring an amount of the beverage dispensed and generating a beverage dispensed signal, wherein the controller is configured to subtract the amount of beverage dispensed from the beverage allocation, whereby the beverage allocation field for the at least one record is updated.

The flow valve 125 may be responsive to the flow signal configured to open in response to the flow signal having been generated, whereby a beverage is dispensed in response to the flow valve 125 opening.

The computing device 135 may be an example of a terminal configured to receive an additional allocation, wherein the terminal is coupled to the controller, wherein the controller is configured to add the additional allocation, and whereby the beverage allocation field for the least one record is updated.

The computing device 135 may detect the identifier. The computing device 135 may also send, to a beverage system server 150, an indication of the identifier. Computing device 135 may include display 140 and QR code reader 145.

The QR code reader 145 may include a camera for capturing an image of the QR code. The QR code reader 145 may also include a detection system coupled to the camera and configured to read the image of the QR code, and interpret the QR code to generate a user identifier.

The beverage system server 150 may be in communication with each beverage source system 105 and configured to send indications to the microcontroller 115, whereby the valve is controlled.

The beverage system server 150 may authorize a customer. The beverage system server 150 may also associate with the authorized customer an optically viewable passive identifier. The beverage system server 150 may also send an indication that a flow valve 125 fluidly coupled to the beverage should be activated.

The beverage system server 150 may authorize a customer via a customer mobile device running a customer mobile application. The beverage system server 150 may also send an indication that a flow valve 125 fluidly coupled to the beverage should be activated.

Beverage system server 150 may be an example of, or include aspects of, the corresponding elements described with reference to FIGS. 2 and 3. Beverage system server 150 may include server processor 155, API 160, and memory 165.

The administrative portal 170 may be in communication with the beverage system server 150. Administrative portal 170 may be an example of, or include aspects of, the corresponding elements described with reference to FIGS. 4-12. In some embodiments the beverage administration portal 170 is a web application with a HTML user interface.

The beverage database 175 may be an example of a database comprising a plurality of records, each record including a user identifier field, and a beverage allocation field. The beverage database 175 may be in communication with the beverage system server 150.

The POS system 180 may be in communication with the beverage system server 150. POS system 180 may include POS terminal 182.

The analytics database 184 may be an example of at least one database storing data on beverage dispensing using the beverage dispensing system 100. Analytics database 184 may include historical data 186 and real-time data 188.

The employee device 190 may be a mobile device running a beverage administration application and in communication with the beverage system server 150, wherein the beverage administration application is configured to allow an employee to perform at least one of set up an account for a customer, take payment from a customer, and control beverage access. Employee device 190 may include employee application 192. Employee application 192 may be configured for any suitable mobile operating system, such as Android® and iOS®.

The customer device 194 may be a mobile device running a customer mobile application 196 and in communication with the beverage system server 150, wherein the customer mobile application is configured to perform at least one of to set up an account, make payments, and control beverage access. The customer device 194 may send a request for dispensing the beverage. The customer mobile application 196 may be configured for any suitable mobile operating system, such as Android® and iOS®.

The customer device 194 may receive user input via a user interface of a wireless device. The customer device 194 may also send wirelessly a request to a remote beverage system server 150 for access to the beverage source 110. The customer device 194 may also receive wirelessly an indication from the beverage system server 150 in response to the request, wherein the indication indicates whether access to the beverage source 110 is authorized. The customer device 194 may also perceptibly indicate to a human user of the wireless device with the wireless device the indication. Customer device 194 may include customer application 196.

Figure 2:
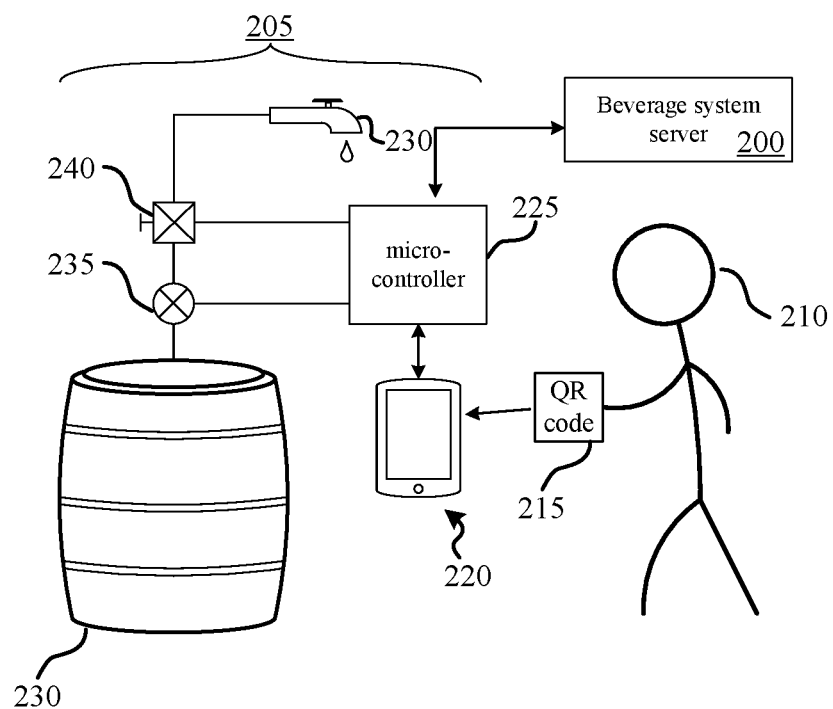
FIG. 2 shows an example of a diagram of a customer obtaining access to one beverage source using an optically viewable passive identifier code in accordance with aspects of the present disclosure.

FIG. 2 shows an example of a diagram of a customer obtaining access to one beverage source using an optically viewable passive identifier code in accordance with aspects of the present disclosure. The example shown includes beverage system server 200, beverage source system 205, user 210, QR code 215, tablet 220, microcontroller 225, beverage source 230, and flow meter 235, and flow valve 240.

Initially, the beverage dispensing system 100 obtains customer information and payment information and links the visual identifier code to the customer. While in the present embodiment a QR code 215 is used to identify the customer and access beverages, it will be understood that any suitable access code or system could be used. The customer uses the tablet 220 to scan the visual identifier code. The user 210 may also activate a manual tap 230 fluidly coupled to the beverage, whereby the beverage is dispensed.

The tablet 220 communicates with the beverage system server 200 to determine whether the customer is allowed access to the beverage source 230. If the customer has access to the beverage source 230, the microcontroller 225 operates the flow valve 240 to allow access to the beverage. As the customer dispenses the beverage, the flow meter 235 sends the beverage amount data (and any other relevant information such as time of dispensing) to the beverage system server 200.

The beverage system server 200 may be in communication with each beverage source system 205 and configured to send indications to the microcontroller 225, whereby the valve 240 is controlled.

Beverage system server 200, beverage source system 205, tablet 220, microcontroller 225, beverage source 230, and flow meter 235, and flow valve 240 may be an example of, or include aspects of, the corresponding elements described with reference to FIGS. 1 and 3.

Figure 3:
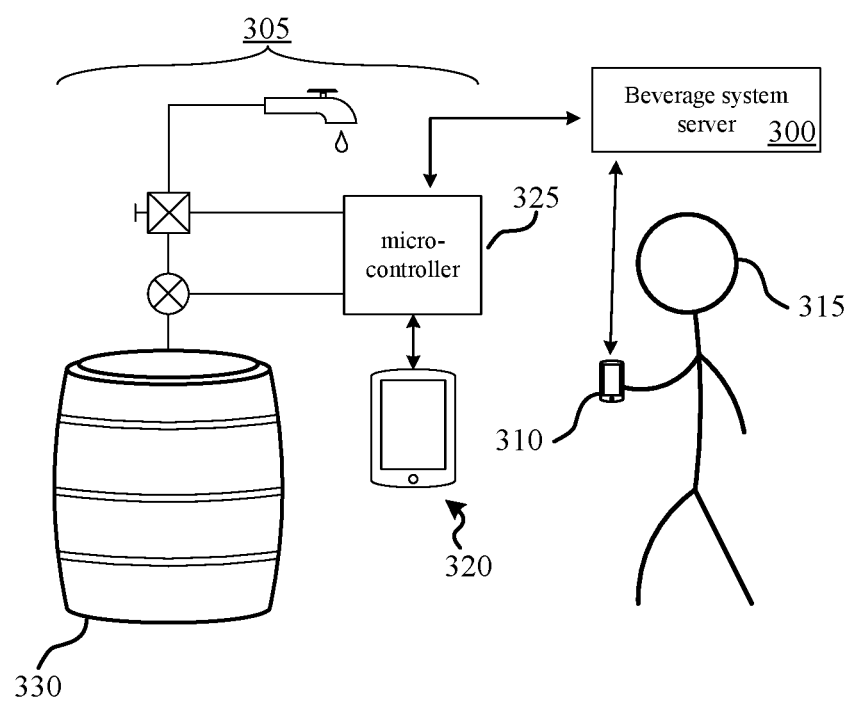
FIG. 3 shows an example of a diagram of a user obtaining access to one beverage source using a mobile device in accordance with aspects of the present disclosure.

FIG. 3 shows an example of a diagram of a user obtaining access to one beverage source using a mobile device 310 in accordance with aspects of the present disclosure. The example shown includes beverage system server 300, beverage source system 305, mobile device 310, user 315, tablet 320, microcontroller 325, and beverage source 330.

In FIG. 3, instead of first obtaining the visual identifier code that interacts with the tablet 320, the user (customer or employee) 315 uses the mobile app running on the mobile device 310 to communicate with the beverage system server 300. Similarly to FIG. 2, if the beverage system server 300 determines that the customer is allowed access to the beverage source 330, the beverage system server 300 directs the microcontroller 325 to allow access to the beverage and receives the beverage data from the beverage source system 305. Referring again to FIGS. 1-3, a drinking or eating establishment may offer dozens of dispensers (or taps) in parallel from which a user or customer can choose.

A typical installation would be at a bar, with 20 to 70 "automated beer taps" installed on one long wall (i.e. an automated "beer dispensing wall"), with beer taps spaced 6 to 8 inches apart. The beer taps are user activated to operate independently of one another, but are controlled by the custom software and hardware to operate under controlled circumstances. In other words, a flow input device, such as a smart tablet computing device or other touchscreen device, at each tap, may be used to activate a flow valve for the tap in the event the user is authorized to dispense the beverage. Circumstances under which the user is authorized to dispense the beverage, for example, include the user's identification having been checked by authorized personnel, such as to verify that the user is of legal age for consuming alcoholic beverages, and verification that the user has prepaid for ounces of beverage that have not yet been dispensed or pre-authorized for payment of amounts of beverage to be dispensed.

The access to dozens of beer taps, each of which is hooked up to a different brand/keg of beer, allows customers to self-serve themselves a beverage of their choice in an amount of their choice. Each beer tap is capable of measuring the amount of beverage dispensed (measured in, for example, $10^{th}$ of an ounce increments or $100^{th}$ of an ounce increments), and each beer tap can, in accordance with some variations, have a different price per ounce associated (for example, Tap #17 might have a price of 50.0 cents per ounce, whereas Tap #38 might have a price of 60.0 cents per ounce). Hence, if a customer dispenses 4.0 ounces of a specific beer on tap #38, which is priced at 60 cents per ounce, then the customer will have just added $2.40 to their bill—payment for which they will have preauthorized, and for which the user will pay, such as on a credit or debit card or on a cardless payment system, when they check out.

Prior to being authorized to dispense beer, in accordance with the present embodiment, users must open an account with the bar. This is typically done by providing the establishment with a credit card and a valid form of identification (such as a driver's license). If the beverage contains alcohol, an operator checks to ensure that the customer is of legal drinking age. (The driver's license can also be scanned, such as by using a magnetic stripe reader, and the user's eligibility to purchase, dispense, and consume the beverage validated by accessing the user's identification information, e.g., age or birthdate.) The account may be opened using a POS terminal, the employee mobile app, or the customer mobile device 310.

In addition to providing a valid form of identification, the user must establish a means of payment, such as a credit card. In accordance with one embodiment, the credit card is charged at the time the customer closed out their account, such at the end of their time at the establishment for that day. In accordance with another embodiment, the credit card is charged a selected amount before the user is permitted to dispense beverages, and authorization to dispense beverages will terminate when this amount is exhausted. At this point the customer's eligibility is validated and means of payment established, and therefore allowed to self-serve their own beverage(s).

Once the customer has opened an account with the establishment (via providing credit card/drivers license), they are then issued a physical item such as a wristband, a card, a paper lanyard, or a drinking glass that contains an optically viewable passive identifier, such as a visual "QR" code. Other optical means may also be utilized, such as the user's driver's license or a display on the user's smartphone. In accordance with an embodiment, each QR code issued by the bar is unique. Each issued QR code is linked 1 to 1 with a specific customer (as previously identified via credit card/drivers license). The QR code (hereafter "wristband", although it will be understood that "wristband" includes any physical item with the optically viewable passive identifier) is used to allow the customer to interact with a smart tablet (via the tablet's camera) associated with each tap, and is used to activate a specific beer tap. In accordance with one embodiment, each smart tablet is mounted directly above each beer tap with which it is associated.

Advantageously, in accordance with one embodiment, the built-in camera of the smart tablet is used to read the QR code. The smart tablet may have a custom laser cut tablet cover that includes a special hole for the tablet camera, customization for customer interaction with the QR code or other features for customer interaction. Once a validated customer presents a QR code to the tablet, the software checks if the customer is valid to have a beverage dispensed (for example, it checks for a valid credit card, and that the customer is of legal age if alcohol is involved).

If the customer is validated, then an internal ("behind the wall") computer-controlled, electrically activated flow value is opened—allowing the beverage to potentially flow. Once the internal flow valve is open, the tablet displays a message to the customer that they can now dispense a beverage by manually activating a beer tap—via pulling a beer tap handle. Once the customer pulls the handle of the beer tap, the beverage will flow into their glass, until they close the beer tap.

The present embodiment dispenses beverages directly to a customer of a drinking establishment (bar, restaurant) or venue in which the beverages are being dispensed (such as a music or sports venue). For example, a common use would be the dispensing of beer in a bar, in which case the present embodiment could be described as "customer-activated beer taps." Once the customer is done consuming beverages, they turn in their QR coded wristband (or other QR enabled device such as a drinking glass with a QR code embossed on it), and their credit card is charged for the total dollar amount consumed. (Alternatively, the user's QR code could be "deactivated" after a prescribed amount of beverage (or cost of beverage) is dispensed, based on, for example, an amount of beverage (or cost of beverage) for which the user or customer has prepaid. In addition, even in the embodiments in which the user does not prepay, an overall consumption limit may be set after which the user's QR code may be deactivated, e.g., in order to prevent the dispensing of the beverage to users who have reached a prescribed limit.)

At that time the QR code is turned off, the QR code can be dis-associated with any specific user or customer so that the QR code can be assigned to another user or customer in the future. In operation, a user or customer submits Legal ID and Credit Card to a merchant; the merchant scans both ID and Credit Card, checks for available credit, and legal drinking age, stores the relevant information, and issues a QR Code to the customer; the system authorizes a specific limit the user or customer can consume before they must "re-update" their limit via updating their QR Code (typical limit is 32 ounces for beer, less for wine/spirits); the user or customer grabs a glass, and proceeds to the user interfaces (e.g., several tablets), and decides which of N beverages they would like to have dispensed; upon selecting one beverage, the customer scans their personal QR Code via the optical reader associated with that specific beverage (currently scanned via the camera in the tablet—with camera acting as optical reader); the system checks to see that the drinking limit (commonly 32 ounces for beer) has not been exceeded; if limit is not exceeded, then the system opens the flow valve, and prompts the user to begin pouring a beverage via the manual tap handle; the beverage pours until either (1) the limit is reached, or (2) flow stops due to the customer returning the manual tap handle to the off position; if the limit has been exceeded, then the flow of beverage is not allowed, and message is displayed on the visual user interface indicating that the limit has been reached, and the customer must re-authorize their QR code should they wish to purchase additional beverages; after the customer has finished consuming beverages they return to the merchant, turn in their QR code, at which time they make payment (cash or credit card) for all beverage consumed.

The beverage system server 300 may be in communication with each beverage source system 305 and configured to send indications to the microcontroller, whereby the valve is controlled.

Beverage system server 300 and beverage source system 305 may be an example of, or include aspects of, the corresponding elements described with reference to FIGS. 1 and 2.

In some embodiments the beverage dispensing system 100 may be configured for a commercial or industrial application, for example dispensing resins or other flowable manufacturing products. The beverage dispensing system 100 not only would allow for dispensing control but would provide valuable data collection and/or analytics for commercial or industrial applications.

FIG. 4 shows an exemplary administrative portal dashboard interface in accordance with aspects of the present disclosure. The administrative portal 400 may be in communication with the beverage system server 150 described herein. Administrative portal 400 may be an example of, or include aspects of, the corresponding elements described with reference to FIGS. 1, and 5-12. Administrative portal 400 may include franchise menu 405, date selection menu 410, username 415, financial data 420, summary 425, and leaderboard 430.

The dashboard interface includes general information for each location using the beverage dispending system. Each location is selected using the drop-down "franchise" selection menu. The information data range is selected using the date selection menus 410. A financial section of the dashboard interface displays financial data 420 for the franchise and date range selected, such as pour count, ounces poured, revenue, discount, and revenue after discount. A summary 425 section of the dashboard interface displays information such as number of ounces poured, ounces per patron (customer), average pour size, and number of patrons. This information is obtained from the databases via the beverage system server. A leaderboard 430 section displays rankings of the most-dispensed beverages.

FIG. 5 shows an exemplary administrative portal franchise interface in accordance with aspects of the present disclosure. Administrative portal 500 may include franchise table 505.

The franchise table 505 lists and displays franchise (location) information. Franchises may be added using the "add new" button. The administrative portal 500 may be in communication with the beverage system server 150.

Administrative portal 500 may be an example of, or include aspects of, the corresponding elements described with reference to FIGS. 1, 4, and 6-12.

FIG. 6 shows an exemplary administrative portal tablet interface in accordance with aspects of the present disclosure. Administrative portal 600 may include tablet table 605.

The location (franchise) is selected using the franchise drop-down menu. The tablet table 605 displays smart tablet information for each tablet at that location. New tablets may be added using the "add new" button.

The administrative portal 600 may be in communication with the beverage system server 150. Administrative portal 600 may be an example of, or include aspects of, the corresponding elements described with reference to FIGS. 1, 4, 5, and 7-12.

FIG. 7 shows an exemplary administrative portal tablet interface in accordance with aspects of the present disclosure. Administrative portal 700 may include tap table 705.

The location (franchise) is selected using the franchise drop-down menu. The tap table 705 displays tap information for each tap at that location. New taps may be added using the "add new" button.

The administrative portal 700 may be in communication with the beverage system server 150. Administrative portal 700 may be an example of, or include aspects of, the corresponding elements described with reference to FIGS. 1, 4-6, and 8-12.

FIG. 8 shows an exemplary administrative portal 800 beverage interface in accordance with aspects of the present disclosure. Administrative portal 800 may include beverage table 805.

The beverage table 805 displays beverage information for each beverage dispensed using the beverage dispensing system 100. New beverages may be added using the "add new" button.

The administrative portal 800 may be in communication with the beverage system server 150. Administrative portal 800 may be an example of, or include aspects of, the corresponding elements described with reference to FIGS. 1, 4-7, and 9-12.

Figure 9:
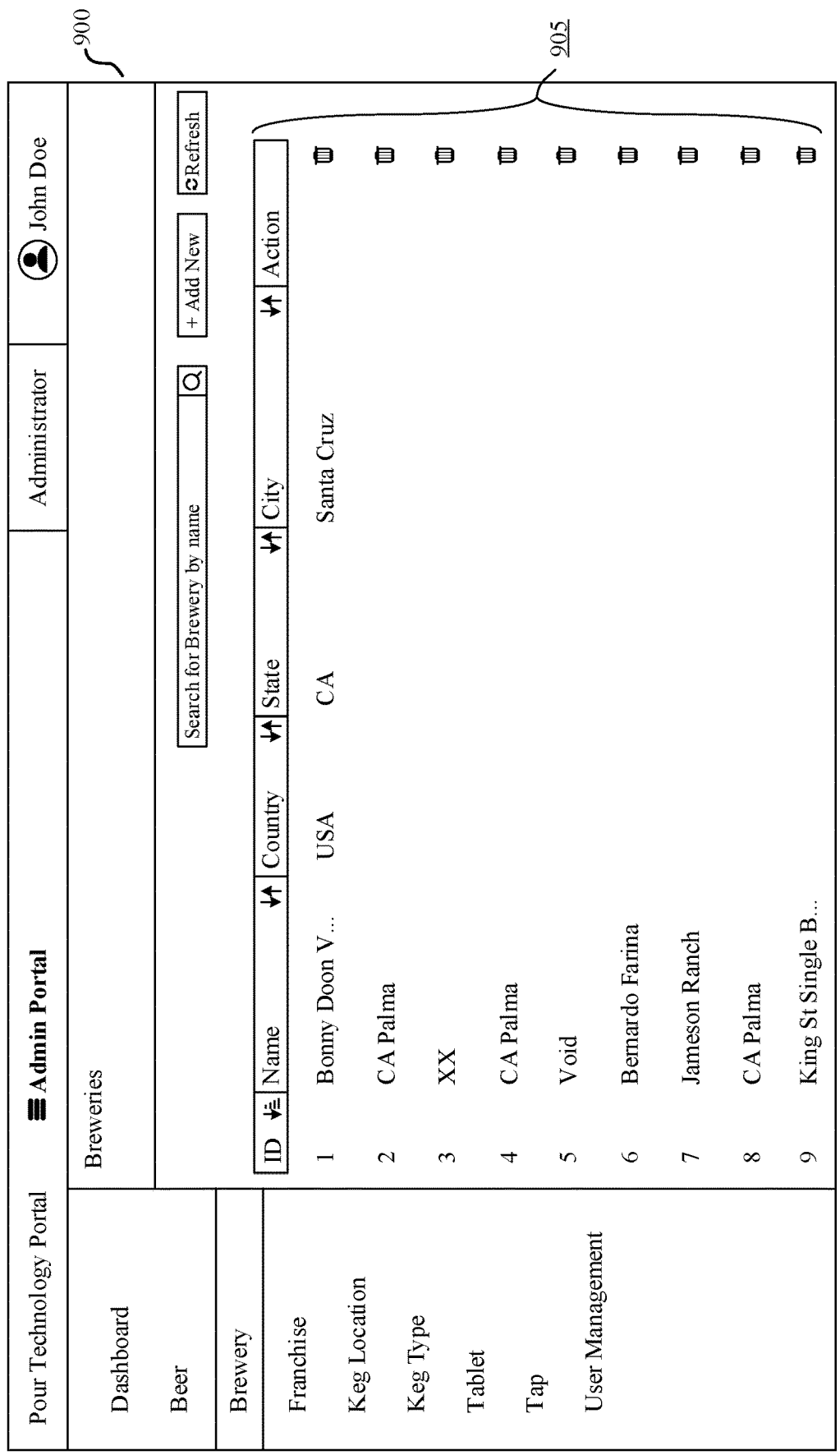
FIG. 9 shows an exemplary administrative portal beverage origin interface in accordance with aspects of the present disclosure.

FIG. 9 shows an exemplary administrative portal beverage origin interface 905 in accordance with aspects of the present disclosure. Administrative portal 900 may include beverage origin interface 905.

The beverage origin table displays the manufacturer details information for each manufacturer with one or more beverages dispensed using the beverage dispensing system 100. New manufacturers may be added using the "add new" button.

The administrative portal 900 may be in communication with the beverage system server 150. Administrative portal 900 may be an example of, or include aspects of, the corresponding elements described with reference to FIGS. 1, 4-8, and 10-12.

FIG. 10 shows an exemplary administrative keg type interface in accordance with aspects of the present disclosure. Administrative portal 1000 may include keg type interface 1005.

The keg type table displays keg type information for each keg type used in the beverage dispensing system 100. New keg types may be added using the "add new" button.

The administrative portal 1000 may be in communication with the beverage system server 150. Administrative portal 1000 may be an example of, or include aspects of, the corresponding elements described with reference to FIGS. 1, 4-9, 11, and 12.

Figure 11:
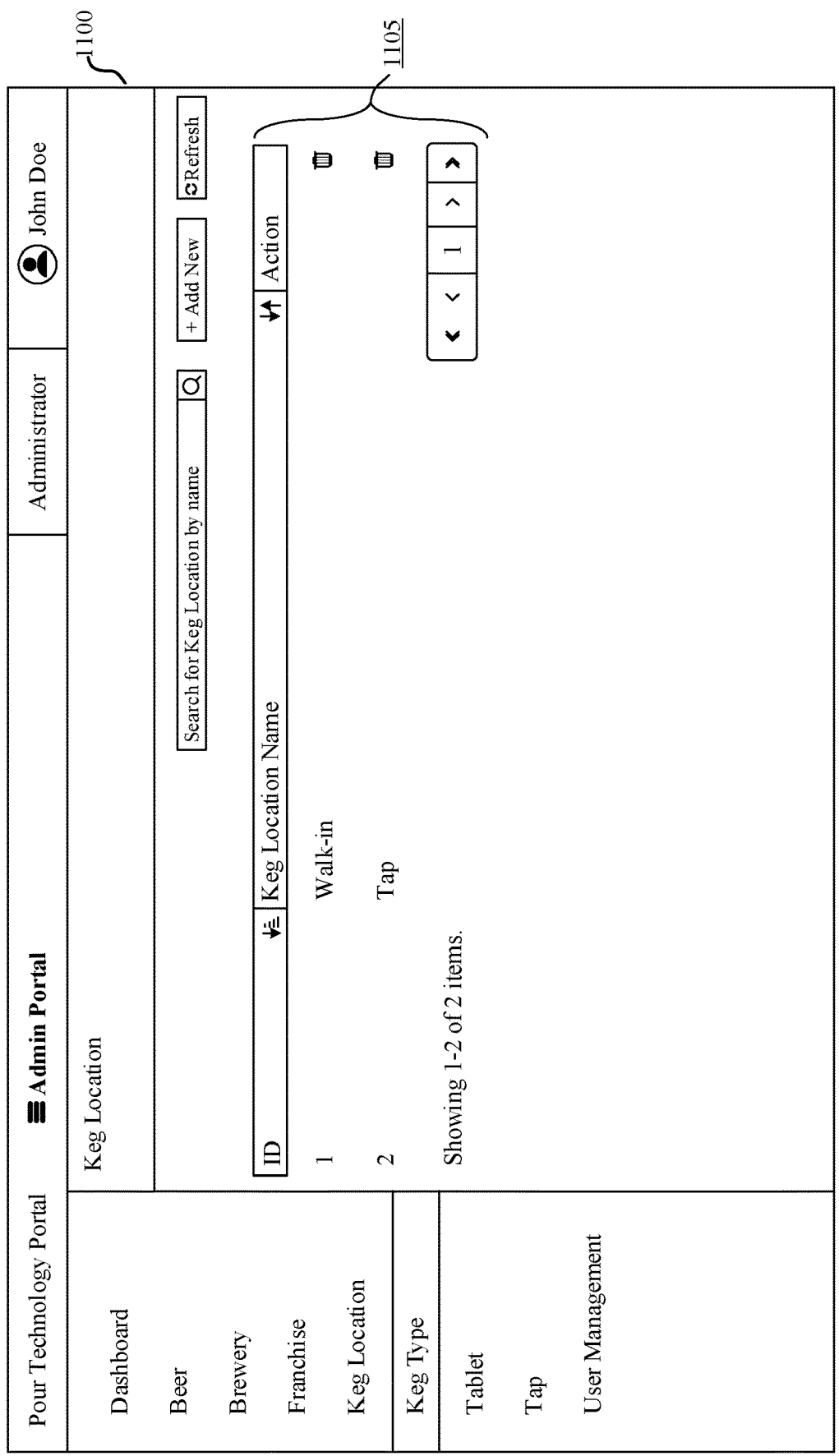
FIG. 11 shows an exemplary administrative keg location interface in accordance with aspects of the present disclosure.

FIG. 11 shows an exemplary administrative keg location interface in accordance with aspects of the present disclosure. Administrative portal 1100 may include keg location interface 1105.

The keg location table displays different keg locations available in the beverage dispensing system 100. New keg locations may be added using the "add new" button.

The administrative portal 1100 may be in communication with the beverage system server 150. Administrative portal 1100 may be an example of, or include aspects of, the corresponding elements described with reference to FIGS. 1, 4-10, and 12.

Figure 12:
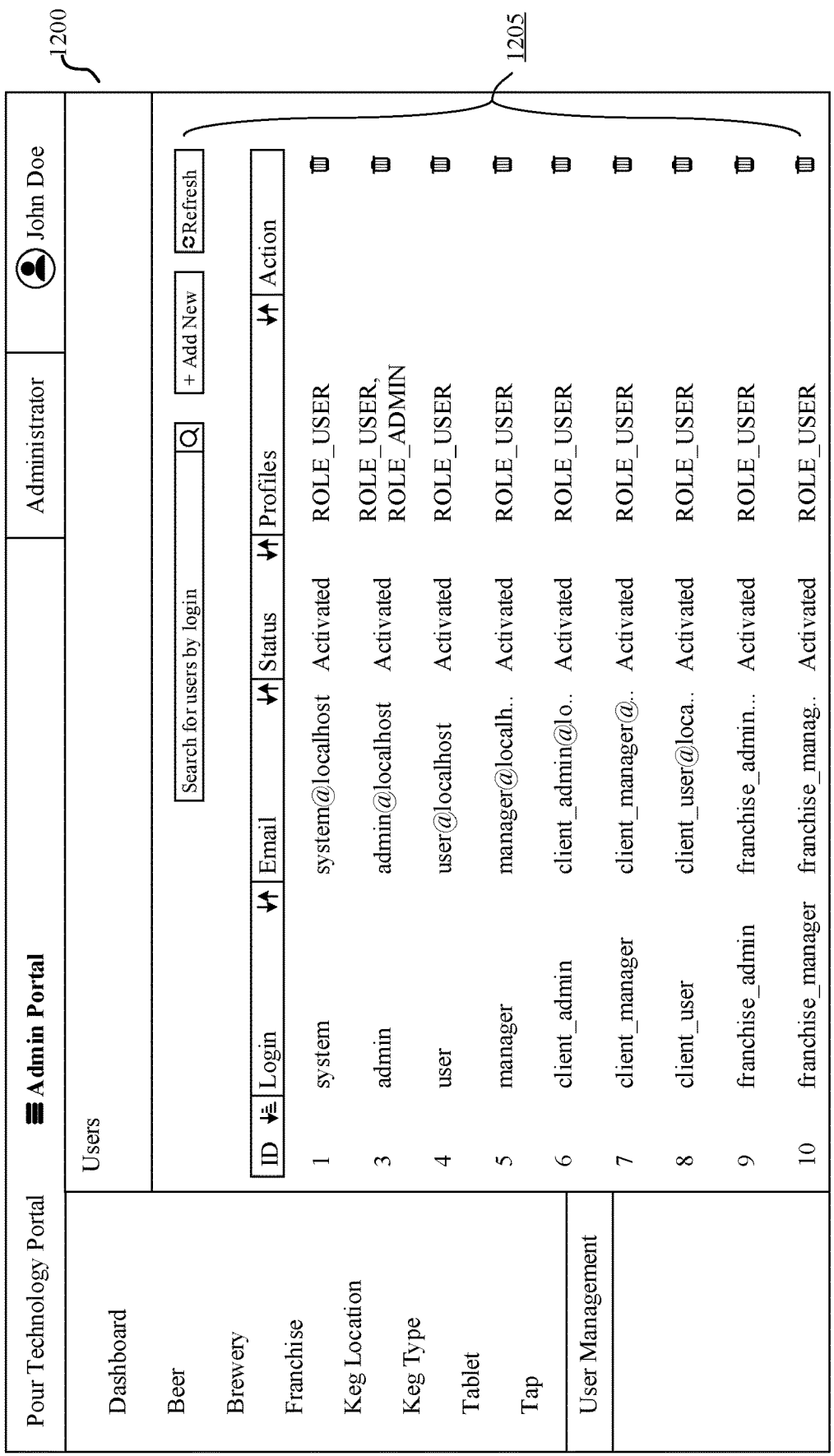
FIG. 12 shows an exemplary administrative user interface in accordance with aspects of the present disclosure.

FIG. 12 shows an exemplary administrative user interface 1205 in accordance with aspects of the present disclosure. Administrative portal 1200 may include user interface 1205.

The user table shows user information for all administrative users. New administrative users may be added using the "add new" button. Referring again to FIGS. 4-12, the administrative portal 1200 is configured to allow employees to input beverage types, track store data, and change pricing. The administrative portal 1200 can track QR-driven sales and integrate POS sales. The administrative portal 1200 is configured to integrate the UNTAPPD® API, or other suitable API, to add new beverages, logos, customer rewards tracking, and associated information. The administrative portal 1200 enables management of individual franchises/licensees and inventory management. The administrative portal 1200 may be configured to receive parameters that can be used to set dynamic pricing. For example, floor and ceiling values for beverages can be set.

The beverage system server 150 may be configured to receive the parameters and dynamically change the pricing of beverages based on the parameters. For example, if the beverage system server determines that a beverage has a pour rate over a period of time that exceeds a pre-set parameter, the server 150 can increase the price. The beverage system server 150 can also use artificial intelligence to learn how to adjust pricing without using the user-set parameters. While the invention herein disclosed has been described by means of specific embodiments, examples and applications thereof, numerous modifications and variations could be made thereto by those skilled in the art without departing from the scope of the invention set forth in the claims.

The administrative portal 1200 may be in communication with the beverage system server 150. Administrative portal 1200 may be an example of, or include aspects of, the corresponding elements described with reference to FIGS. 1, and 4-11.

Figure 13:
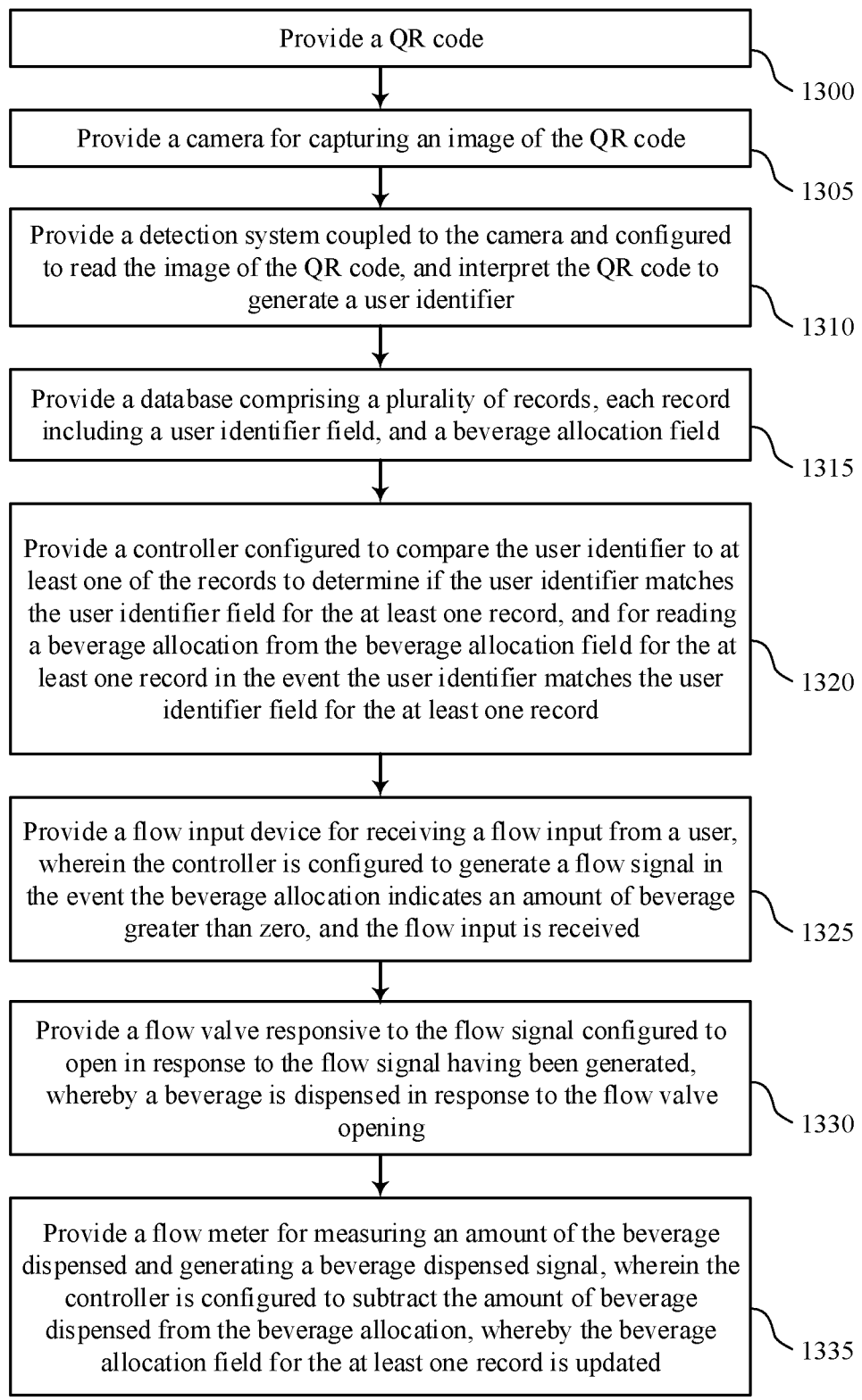
FIGS. 13 through 14 show an example of a process for producing a beverage dispensing system in accordance with aspects of the present disclosure.

FIG. 13 shows an example of a process for producing a beverage dispensing system in accordance with aspects of the present disclosure. In some examples, these operations may be performed by a processor executing a set of codes to control functional elements of an apparatus. Additionally or alternatively, the processes may be performed using special-purpose hardware. Generally, the operations may be composed of various substeps, or may be performed in conjunction with other operations described herein.

At step 1300, a QR code may be provided. In some cases, the operations of this step may be performed by a customer or employee after production of the system.

At step 1305, the production system may provide a camera for capturing an image of the QR code. In some cases, the camera may be part of the QR code reader as described with reference to FIG. 1.

At step 1310, the production system may provide a detection system coupled to the camera and configured to read the image of the QR code, and interpret the QR code to generate a user identifier. In some cases, the detection system may be part of the QR code reader as described with reference to FIG. 1.

At step 1315, the production system may provide a database comprising a plurality of records, each record including a user identifier field, and a beverage allocation field.

At step 1320, the production system may provide a controller configured to compare the user identifier to at least one of the records to determine if the user identifier matches the user identifier field for the at least one record, and for reading a beverage allocation from the beverage allocation field for the at least one record in the event the user identifier matches the user identifier field for the at least one record.

At step 1325, the production system may provide a flow input device for receiving a flow input from a user, wherein the controller is configured to generate a flow signal in the event the beverage allocation indicates an amount of beverage greater than zero, and the flow input is received.

At step 1330, the production system may provide a flow valve responsive to the flow signal configured to open in response to the flow signal having been generated, whereby a beverage is dispensed in response to the flow valve opening.

At step 1335, the production system may provide a flow meter for measuring an amount of the beverage dispensed and generating a beverage dispensed signal, wherein the controller is configured to subtract the amount of beverage dispensed from the beverage allocation, whereby the beverage allocation field for the at least one record is updated.

Figure 14:
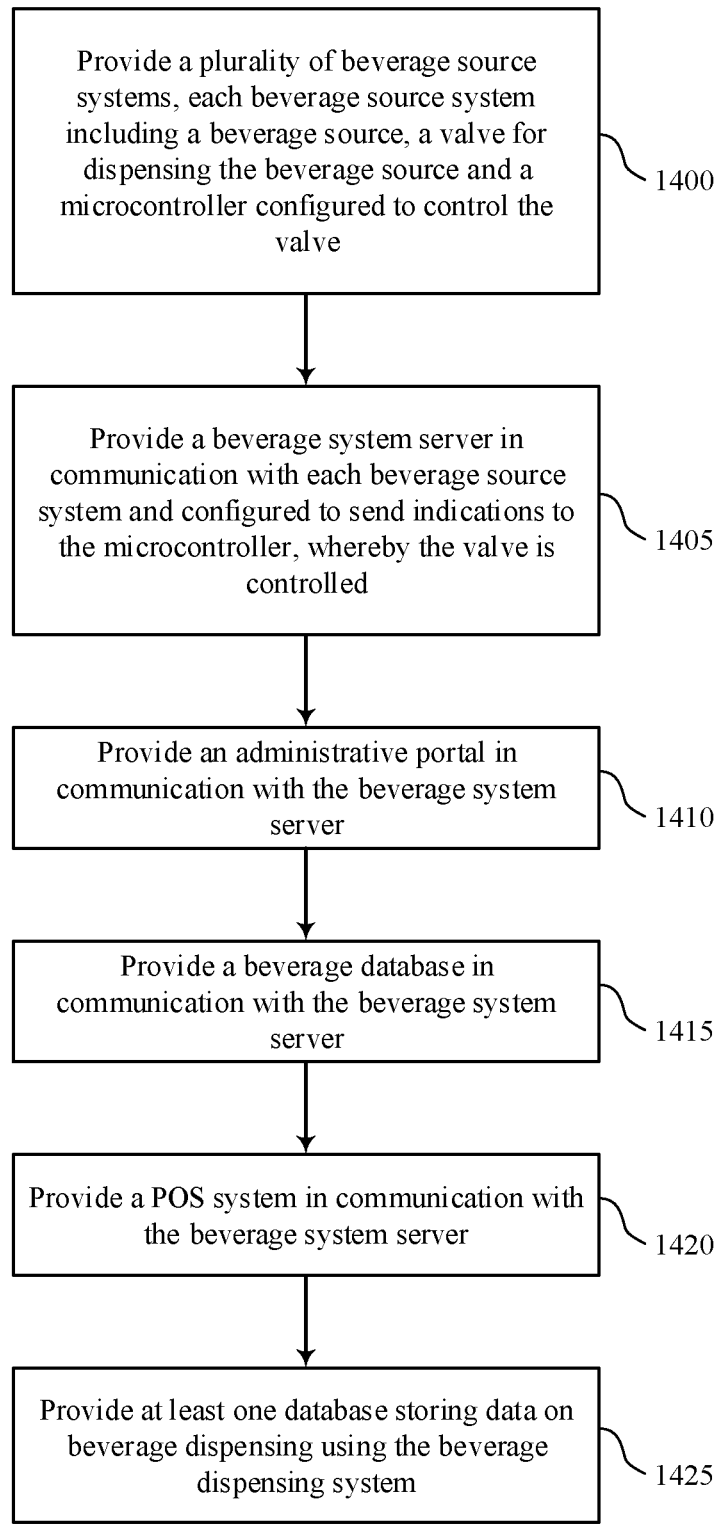

FIG. 14 shows an example of a process for producing a beverage dispensing system in accordance with aspects of the present disclosure. In some examples, these operations may be performed by a processor executing a set of codes to control functional elements of an apparatus. Additionally or alternatively, the processes may be performed using special-purpose hardware. Generally, the operations may be composed of various substeps, or may be performed in conjunction with other operations described herein.

At step 1400, the production system may provide a plurality of beverage source systems, each beverage source system including a beverage source, a valve for dispensing the beverage source and a microcontroller configured to control the valve.

At step 1405, the production system may provide a beverage system server 150 in communication with each beverage source system and configured to send indications to the microcontroller, whereby the valve is controlled.

At step 1410, the production system may provide an administrative portal in communication with the beverage system server 150.

At step 1415, the production system may provide a beverage database in communication with the beverage system server 150.

At step 1420, the production system may provide a POS system in communication with the beverage system server 150.

At step 1425, the production system may provide at least one database storing data on beverage dispensing using the beverage dispensing system.

Figure 15:
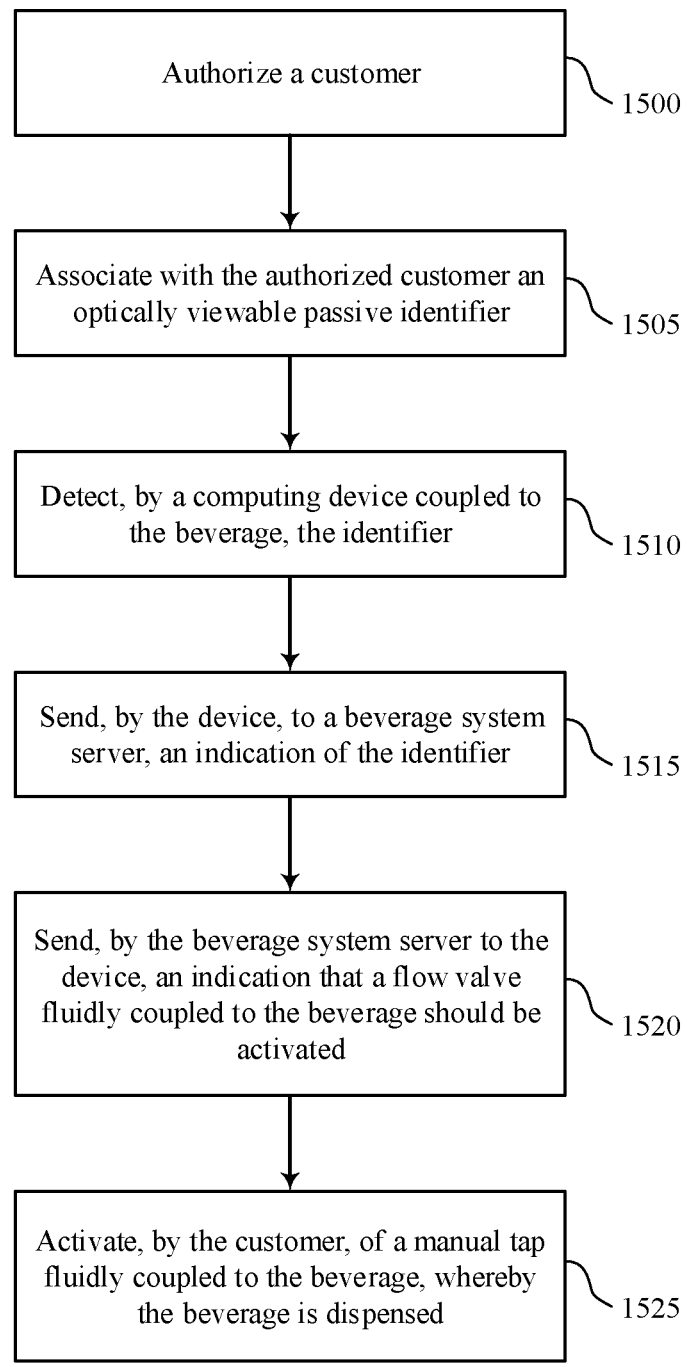
FIGS. 15 through 17 show an example of a process for dispensing a beverage in accordance with aspects of the present disclosure.

FIG. 15 shows an example of a process for dispensing a beverage in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1500, a system may authorize a customer. In some cases, the operations of this step may be performed by a beverage system server 150 as described with reference to FIGS. 1, 2, and 3.

At step 1505, a system may associate with the authorized customer an optically viewable passive identifier. In some cases, the operations of this step may be performed by a beverage system server 150 as described with reference to FIGS. 1, 2, and 3.

At step 1510, the system may detect, by a computing device coupled to the beverage, the identifier. In some cases, the operations of this step may be performed by a computing device as described with reference to FIG. 1.

At step 1515, the system may send, by the device, to a beverage system server 150, an indication of the identifier. In some cases, the operations of this step may be performed by a computing device as described with reference to FIG. 1.

At step 1520, the system may send, by the beverage system server 150 to the device, an indication that a flow valve fluidly coupled to the beverage should be activated. In some cases, the operations of this step may be performed by a beverage system server 150 as described with reference to FIGS. 1, 2, and 3.

At step 1525, the customer may activate a manual tap fluidly coupled to the beverage, whereby the beverage is dispensed. In some cases, the operations of this step may be performed by a user as described with reference to FIG. 2.

Figure 16:
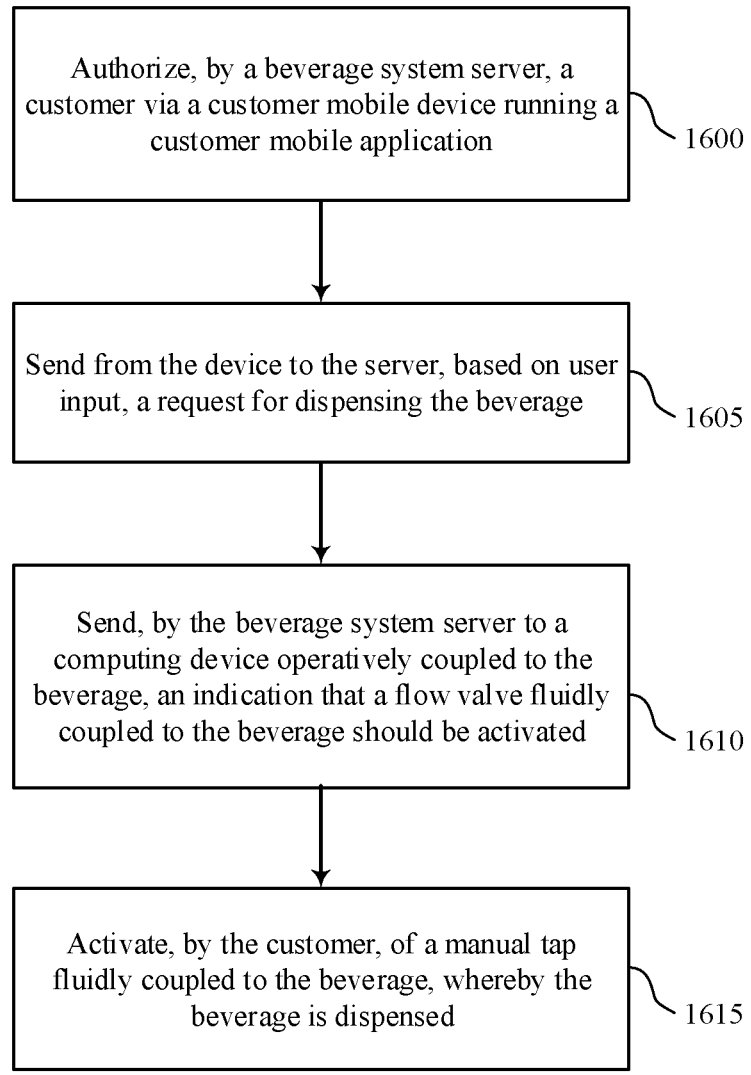

FIG. 16 shows an example of a process for dispensing a beverage in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1600, the system may authorize, by a beverage system server 150, a customer via a customer mobile device running a customer mobile application. In some cases, the operations of this step may be performed by a beverage system server 150 as described with reference to FIGS. 1, 2, and 3.

At step 1605, the system may send from the device to the server, based on user input, a request for dispensing the beverage. In some cases, the operations of this step may be performed by a customer device as described with reference to FIG. 1.

At step 1610, the system may send, by the beverage system server 150 to a computing device operatively coupled to the beverage, an indication that a flow valve fluidly coupled to the beverage should be activated. In some cases, the operations of this step may be performed by a beverage system server 150 as described with reference to FIGS. 1, 2, and 3.

At step 1615, the customer may activate a manual tap fluidly coupled to the beverage, whereby the beverage is dispensed. In some cases, the operations of this step may be performed by a user as described with reference to FIG. 2.

Figure 17:
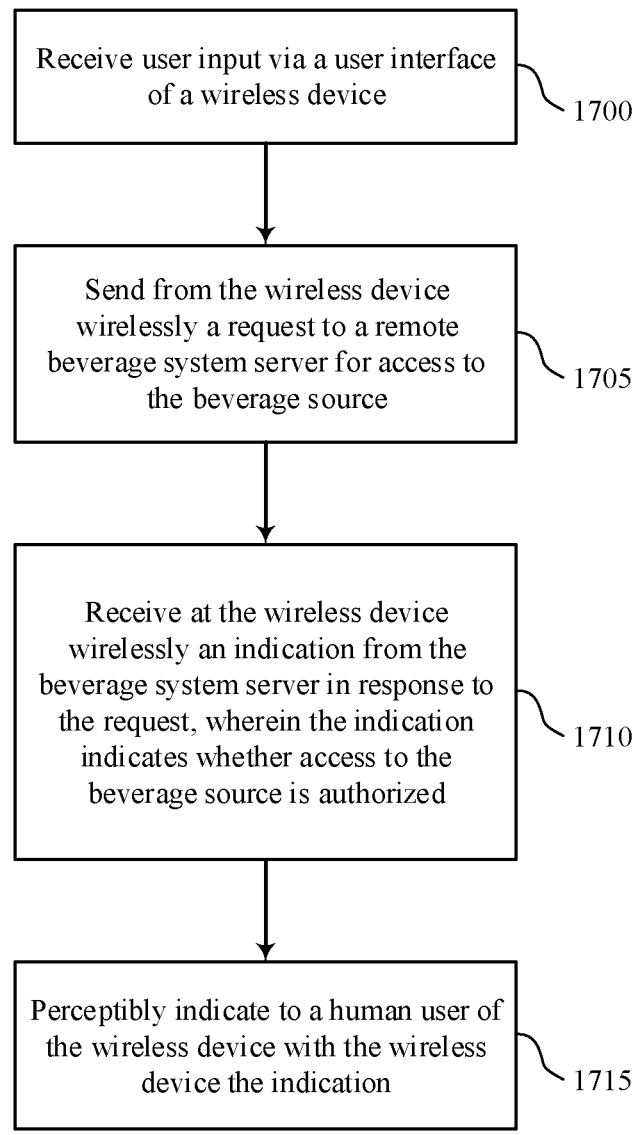

FIG. 17 shows an example of a process for dispensing a beverage in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1700, a system may receive user input via a user interface of a wireless device. In some cases, the operations of this step may be performed by a customer device as described with reference to FIG. 1.

At step 1705, the system may send from the wireless device wirelessly a request to a remote beverage system server 150 for access to the beverage source. In some cases, the operations of this step may be performed by a customer device as described with reference to FIG. 1.

At step 1710, the system may receive at the wireless device wirelessly an indication from the beverage system server 150 in response to the request, wherein the indication indicates whether access to the beverage source is authorized. In some cases, the operations of this step may be performed by a customer device as described with reference to FIG. 1.

At step 1715, the system may perceptibly indicate to a human user of the wireless device with the wireless device the indication. In some cases, the operations of this step may be performed by a customer device as described with reference to FIG. 1.

Figure 18:
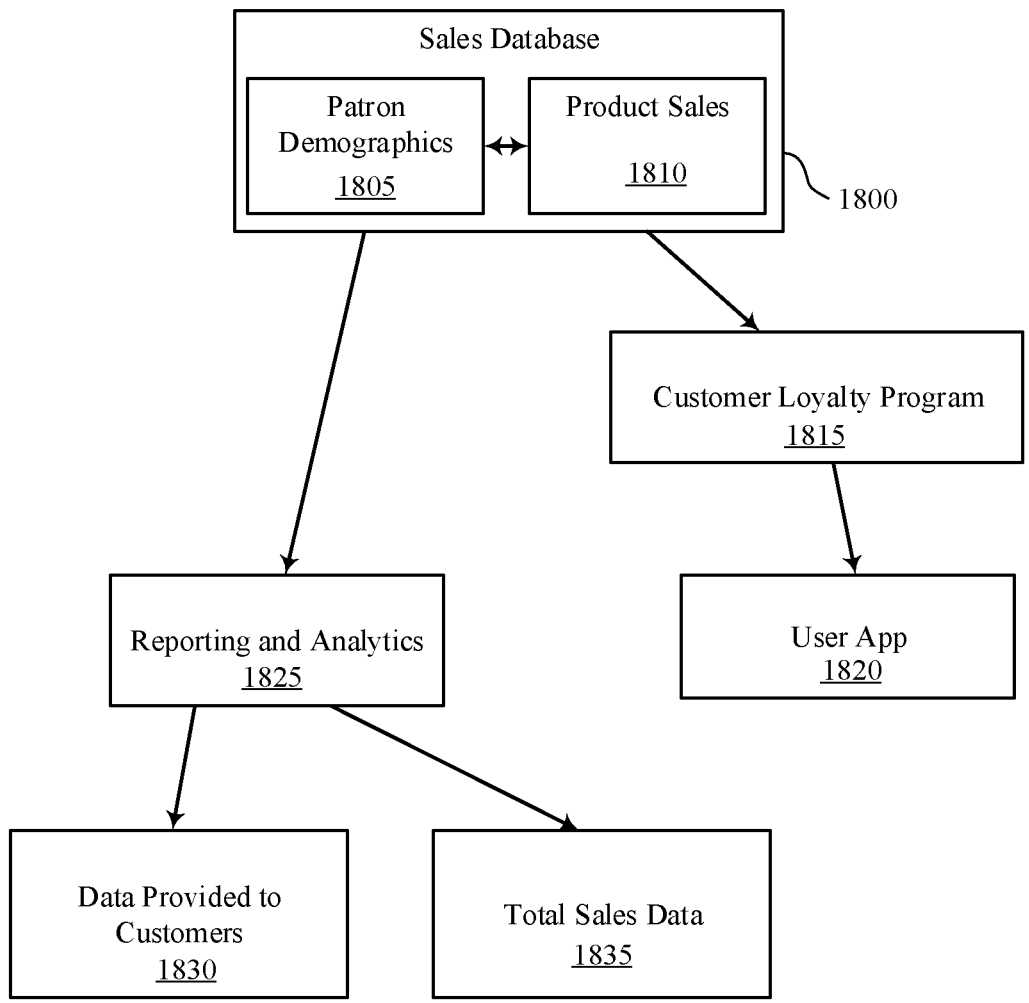
FIG. 18 shows a schematic block diagram for a Data and Analytics system in accordance with aspects of the present disclosure.

Referring next to FIG. 18, a schematic block diagram for a Data and Analytics system is shown in one embodiment of the present invention.

In one embodiment the Data and Analytics system is integrated into the beverage dispensing system 100, for example incorporating the analytics database 184 and the beverage system server 150. In other embodiments the beverage dispensing system 100 may send the data to a stand-alone Data and Analytics system (including storage and processing as require).

A sales database 1800 includes at least a patron demographics database 1805 and a product sales database 1810. The patron demographics database 1805 and the product sales database 1810 are configured to exchange data. The patron demographics database 1805 includes information such as age, gender, region (where they are from), etc. The product sales database 1810 includes information such as price per ounce, average pour, top choices per patron, total sales per patron, total sales per product, total sales per category (e.g. IPAs), etc.

A reporting and analytics module 1825 receives data from the sales database 1800 and is configured to produce customizable reports for pour technicians (i.e. owners/employees). A customer data module 1830 receives data from the reporting and analytics module 1825 and is configured to produce reports for beverage system operators (e.g. bar owners). The reports may include suggested product offerings (e.g. what percentage of IPAs to provide, what percentage of ciders to provide, etc., recommendations for brands) and pricing and information on trends.

A total sales data module 1830 receives data from the reporting and analytics module 1825 and is configured to provide information such as best sellers by category, price per ounce, and trend data. The output may be configured for sale as a subscription service, for example for selling to brewers, breweries, trade groups, and/or non-self-pour bars. This service can be used to monitor trends and national sales data and/or maximize revenue.

A customer loyalty program module 1815 received data from the sales database 1800 and is configured to use data to target individual customers (for example to increase sales). For example, the customer loyalty can determine top beverage type/category poured for each user. For example, if a user has not frequented the establishment for a certain length of time (e.g. two weeks), the customer loyalty program module 1815 can send the customer a notification of a discount. In some cases the notification is triggered by an event (e.g. a beverage belonging to the user's top category is added.

A user application 1820 on a user computing device can receive notifications, such as push notifications, for discounts and other information, for example from the customer loyalty program module 1815. In some embodiments the user application is the customer application 196 as shown in FIG. 1.

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A beverage dispensing system for a plurality of beverage sources, comprising:
   a first controller;
   an optically viewable passive identifier associated with a user;
   a first tablet computing device mounted to a wall and including:
      a first processor;
      a first user interface comprising a touchscreen display whereby the first tablet computing device mounted to the wall is configured to receive input from the user via the touchscreen display,
      a first built-in camera configured to capture an image of the optically viewable passive identifier, and
      a first code reader configured to interpret the image of the optically viewable passive identifier captured by the first built-in camera, wherein the first code reader comprises a first detection system coupled to the first built-in camera and configured to receive the image of the optically viewable passive identifier, read the image of the optically viewable passive identifier, and interpret the image of the optically viewable passive identifier to generate a user identifier associated with the user;
   a server in communication with the first controller, the first tablet computing device and a database comprising a plurality of records, each record including a user identifier field comprising a user identifier and a beverage allocation field comprising a beverage allocation value, wherein the beverage allocation value indicates a maximum amount of beverage allowed to be dispensed for the user, wherein the first tablet computing device is configured to send the generated user identifier to the server, the server further configured to compare the generated user identifier to at least one of the records to determine if the generated user identifier matches one user identifier included in the user identifier field, and in response to the generated user identifier matching, reading the beverage allocation value from the beverage allocation field of the matched record and sending the beverage allocation value to the first controller, wherein the first controller is configured to generate a first flow signal when the beverage allocation value indicates an amount of beverage greater than zero;
   a first flow valve in fluid communication with a first beverage source and responsive to the first flow signal, the first flow valve configured to open in response to the first flow signal having been generated by the first controller;
   a first manually-controlled tap valve in fluid communication with and downstream from the first flow valve, wherein the first tap valve is installed on the wall such that the first tablet computing device is located directly above the first tap valve, whereby the first beverage is dispensed from the first beverage source in response to both the first flow valve opening and manual activation of the first tap valve by the user;
   a first flow meter coupled to the first controller, and in fluid communication with the first beverage source, for measuring an amount of the first beverage dispensed and generating a beverage dispensed signal indicating an amount of beverage dispensed, wherein the first controller is configured to receive the beverage dispensed signal and send the beverage dispensed signal to the server, wherein the server is further configured to subtract the amount of beverage dispensed from the beverage allocation value, whereby the beverage allocation field for the at least one record is updated, wherein the beverage dispensing system is further configured to, after dispensing the first beverage, receive an additional allocation input via the touchscreen display of the first tablet computing device, wherein the additional allocation input indicates an amount to be added to the beverage allocation value, send the additional allocation value to the server, and add the additional allocation value to the beverage allocation value;
   a second tablet computing device mounted to the wall and in communication with the server, comprising:
      a second processor;
      a second user interface comprising a touchscreen display whereby the second tablet computing device mounted to the wall is configured to receive input from the user via the touchscreen display,
      a second built-in camera configured to capture an image of the optically viewable passive identifier,
      a second code reader configured to interpret the image of the optically viewable passive identifier captured by the second built-in camera, wherein the second code reader comprises a second detection system coupled to the second built-in camera and configured to receive the image of the optically viewable passive identifier, read the image of the optically viewable passive identifier, and interpret the image of the optically viewable passive identifier to generate the user identifier associated with the user, wherein the second tablet computing device is further configured to send the generated user identifier to the server;
   a second controller in communication with the server and configured to receive the beverage allocation value from the server and generate a second flow signal when the beverage allocation value indicates an amount of beverage greater than zero;
   a second flow valve in fluid communication with a second beverage source and responsive to the second flow signal and configured to open in response to the second flow signal having been generated;
   a second manually-controlled tap valve in fluid communication with and downstream from the second flow valve, wherein the second tap valve is installed on the wall such that the second tablet computing device is directly above the second tap valve, whereby the second beverage is dispensed in response to both the second flow valve opening and the manual activation of the second tap valve by the user;

a second flow meter for measuring an amount of the second beverage dispensed in response to the opening of the second flow valve and generating a second beverage dispensed signal, wherein the second controller is configured to subtract the amount of second beverage dispensed from the beverage allocation, whereby the beverage allocation field for the record is updated.

2. A method of using an apparatus for dispensing a plurality of beverages from a plurality of beverage sources, the method comprising:

providing an optically viewable passive identifier associated with a user;

providing a first tablet computing device mounted to a wall and including a first processor, a first built-in camera, and a first user interface comprising a touchscreen display, whereby the first tablet computing device is configured to receive input from the user via the touchscreen display, the first tablet computing device further comprising a first code reader configured to interpret an image of an optically viewable passive identifier, the first code reader further comprising a first detection system coupled to the first built-in camera and configured to receive an image of a optically viewable passive identifier, read the received image of the optically viewable passive identifier, and interpret the received image of the optically viewable passive identifier to generate a user identifier associated with a user;

using the first code reader to capture an image of the optically viewable passive identifier;

using the first detection system to read the image of the optically viewable passive identifier, and interpret the image of the optically viewable passive identifier to generate a user identifier associated with the user;

using a database comprising a plurality of records, each record including a user identifier field comprising a user identifier, and a beverage allocation field comprising a beverage allocation value, wherein the beverage allocation value indicates a maximum amount of beverage allowed to be dispensed for the user;

using a server in communication with the database and the first tablet computing device to receive the generated user identifier and compare the generated user identifier to at least one of the records to determine if the generated user identifier matches one user identifier field, and in response to the generated user identifier matching, reading the beverage allocation value from the beverage allocation field of the matched record and sending the beverage allocation value to a first controller in communication with the server;

generating by the first controller a first flow signal in the event the beverage allocation value indicates an amount of beverage greater than zero;

opening a first flow valve in communication with a first beverage source in response to the first flow signal having been generated;

manually activating of a first manually-controlled tap valve by the user, wherein the first tap valve is in fluid communication with and downstream from the first flow valve, wherein the first tap valve is installed on the wall such that the first tablet computing devise is located directly above the first manual tap valve, whereby the first beverage is dispensed from the first beverage source in response to both the first flow valve opening and manual activation of the first tap valve by the user; and using a first flow meter coupled to the first controller, and in fluid communication with the first beverage source, to measure an amount of the beverage dispensed and generating a beverage dispensed signal indicating an amount of beverage dispensed;

receiving by the server of the amount of the beverage dispensed;

subtracting by the server of the amount of beverage dispensed from the beverage allocation value, whereby the beverage allocation field for the at least one record is updated;

receiving, after dispensing the beverage, an additional allocation input via the touchscreen display of the first tablet computing device in communication with the server, wherein the additional allocation input indicates an amount to be added to the beverage allocation value;

sending the additional allocation value to the server;

adding the additional allocation value to the beverage allocation value;

providing a second tablet computing device mounted to the wall and in communication with the server and including a second processor, a second built-in camera, and a second user interface comprising a touchscreen display, whereby the second tablet computing device is configured to receive input from the user via the touchscreen display, the second tablet computing device further comprising a second code reader configured to interpret an image of an optically viewable passive identifier, the second code reader further comprising a second detection system coupled to the second built-in camera and configured to receive an image of a optically viewable passive identifier, read the received image of the optically viewable passive identifier, and interpret the received image of the optically viewable passive identifier to generate a user identifier associated with a user;

using the second code reader to capture an image of the optically viewable passive identifier;

using the second detection system to read the image of the optically viewable passive identifier, and interpret the image of the optically viewable passive identifier to generate a user identifier associated with the user;

using the server to receive the generated user identifier from the second tablet computing device and compare the generated user identifier to at least one of the records to determine if the generated user identifier matches one user identifier field, and in response to the generated user identifier matching, reading the beverage allocation value from the beverage allocation field of the matched record and sending the beverage allocation value to a second controller in communication with the server;

using the second controller to receive the beverage allocation from the server and generate a second flow signal when the beverage allocation value indicates an amount of beverage greater than zero;

opening a second flow valve in fluid communication with a second beverage source in response to the second flow signal having been generated;

manually activating of a second manually-controlled tap valve in fluid communication with and downstream from the second flow valve, wherein the second tap valve is installed on the wall such that the second tablet computing device is directly above the second tap valve; and, whereby the second beverage is dispensed in response to the second flow valve opening and the manual activation of the second tap valve by the user; and using a second flow meter to measure an amount of the second beverage dispensed in response to the opening of the second flow valve and generating a second beverage dispensed signal, wherein the second controller is configured to subtract the amount of beverage dispensed from the beverage allocation, whereby the beverage allocation field for the record is updated.

3. The method of claim 2, further comprising:

prior to the step of providing the optically viewable passive identifier associated with the user, authorizing the user; and associating with the authorized user the optically viewable passive identifier.

4. A system for dispensing a beverage, comprising:

a plurality of beverage source systems, each beverage source system located at the same franchise location and including:
   a beverage source,
   a flow valve for dispensing the beverage source,
   a tablet computing device mounted to a wall including a processor, a display, a user interface comprising a touchscreen display, a built-in camera configured to capture an image of an optically viewable passive identifier, and a code reader, wherein the code reader is configured to interpret the image of the optically viewable passive identifier captured by the built-in camera, wherein the code reader comprises a detection system coupled to the built-in camera and configured to receive the image of the optically viewable passive identifier, read the image of the optically viewable passive identifier, and interpret the optically viewable passive identifier to generate a user identifier associated with the user,
   a manually-controlled tap valve in fluid communication with and downstream from the flow valve, wherein the tap valve is installed on the wall such that the tablet computing device is directly above the tap valve, and
   a microcontroller configured to control the flow valve, whereby the beverage is dispensed from the beverage source when the microcontroller controls the flow valve to open the flow valve and the tap valve is manually opened by a user;

a beverage system server in communication with each beverage source system and configured to receive data from the tablet computing device and send indications to the microcontroller, whereby the flow valve is controlled;

a point-of-sale (POS) system in communication with the beverage system server; and at least one database storing data on beverage dispensing using the beverage dispensing system, wherein the database includes a plurality of records wherein each record is associated with a user and includes a user identifier field and a beverage allocation field, wherein each user identifier field contains a user identifier associated with the associated user and the beverage allocation field contains a beverage allocation value indicating a maximum amount of beverage allowed to be dispensed to the associated user; and an administrative portal in communication with the beverage system server, wherein the administrative portal includes a database including a record for each of the tablet computing devices at the franchise location, wherein each record includes information about the tablet computing device, the information including a unique identifier for each tablet computing device, the administrative portal including an administrative portal user interface configured to display the tablet computing device information to an administrator of the beverage system, the administrative portal user interface further configured to receive user input for adding an additional tablet computing device, whereby information for the additional tablet computing device is added to the database.

5. The system of claim 4, the system further comprising:

at least one employee mobile device running a beverage administration application and in communication with the beverage system server, wherein the beverage administration application is configured to allow an employee to access a plurality of user accounts stored on the database and perform at least one of set up an account for a customer, take payment from a customer, and control beverage access.

6. The system of claim 4, the system further comprising:

at least one customer mobile device running a customer mobile application and in communication with the beverage system server, wherein the customer mobile application is configured to perform at least one of set up an account, make payments, and control beverage access.

* * * * *

UNITED STATES PATENT AND TRADEMARK OFFICE
CERTIFICATE OF CORRECTION

PATENT NO. : 11,053,113 B2
APPLICATION NO. : 16/016519
DATED : July 6, 2021
INVENTOR(S) : Tomforde et al.

Page 1 of 1

It is certified that error appears in the above-identified patent and that said Letters Patent is hereby corrected as shown below:

On the Title Page

Item (56), Column 2, OTHER PUBLICATIONS, Line 2, delete "Interneton" and insert --Internet on--.

In the Claims

Claim 2, Column 21, Line 65, delete "devise" and insert --device--.
Claim 4, Column 24, Line 5, after "server;" delete "and".

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*